Figure 1:
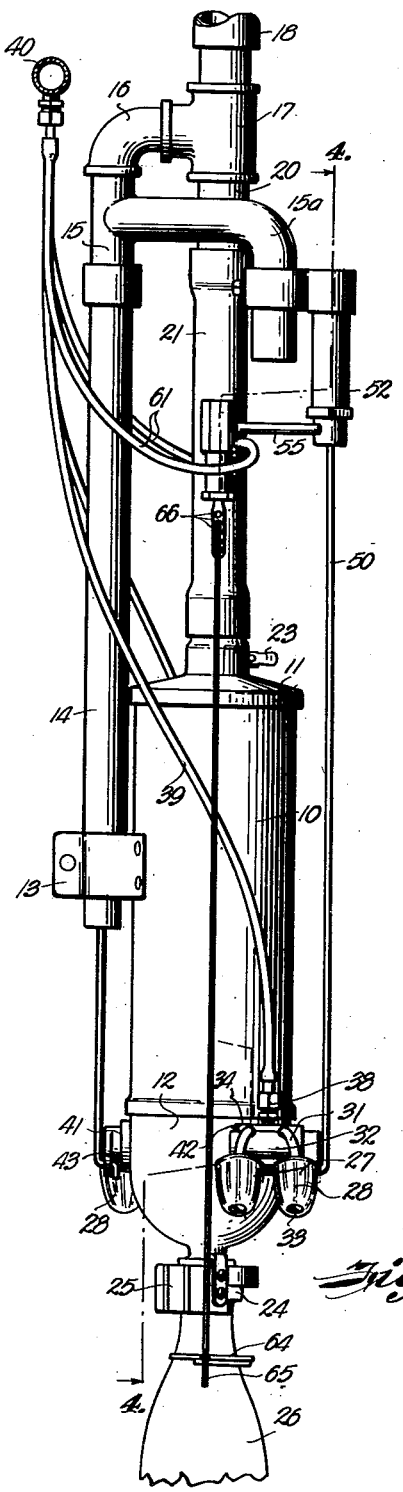

Jan. 1, 1952

J. M. VANSANT 2,581,054

APPARATUS FOR BREAKING EGGS AND SALVAGING
LIQUID EGG MATERIAL

Filed Jan. 23, 1947

2 SHEETS—SHEET 1

Inventor
John M. Vansant
By Thos. E. Aufield.
Attorney

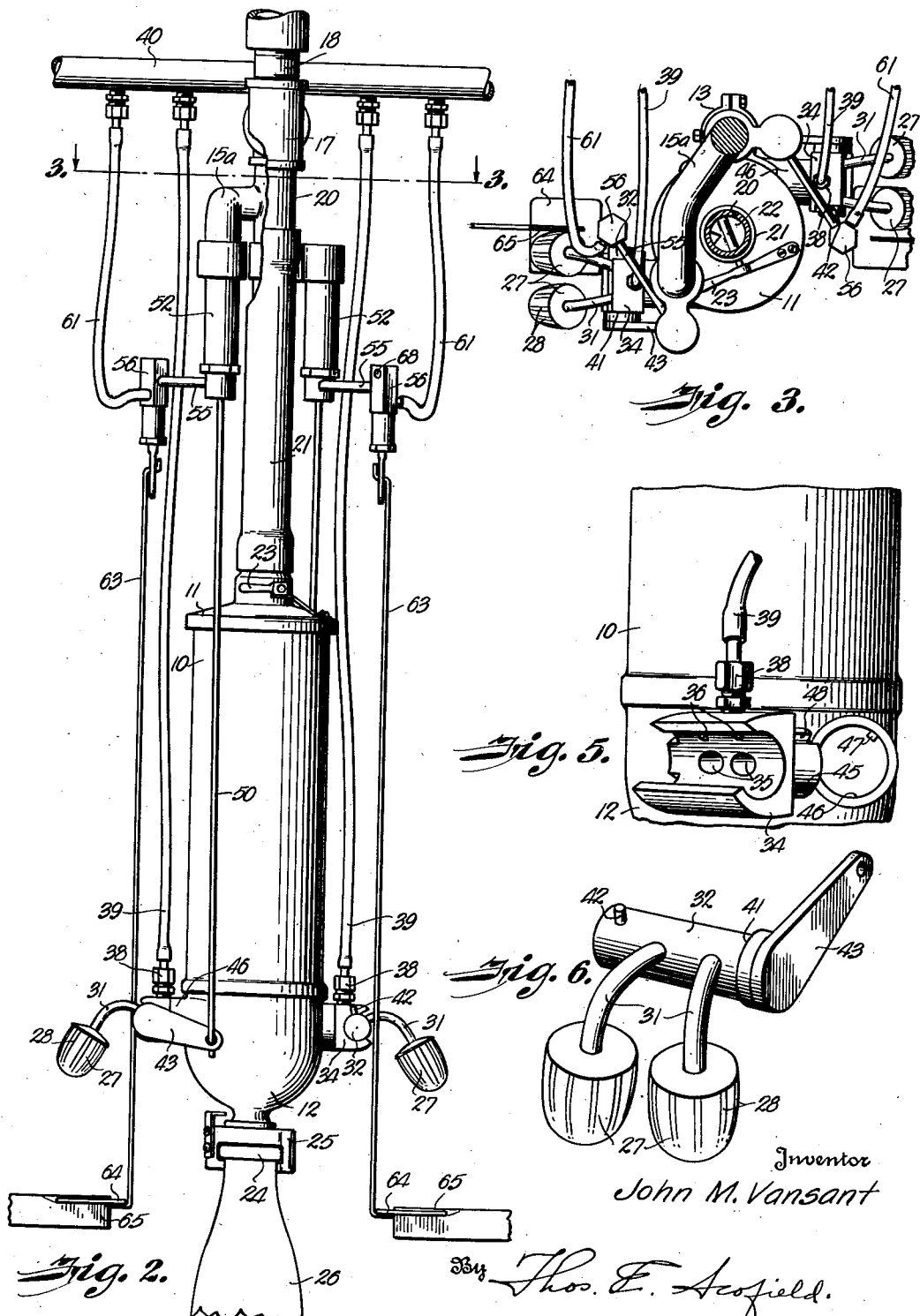

Patented Jan. 1, 1952

2,581,054

UNITED STATES PATENT OFFICE 2,581,054

APPARATUS FOR BREAKING EGGS AND SALVAGING LIQUID EGG MATERIAL

John M. Vansant, Topeka, Kans.

Application January 23, 1947, Serial No. 723,684

18 Claims. (Cl. 146—2)

The present invention relates in general to the method and apparatus for breaking eggs and extracting liquid egg material therefrom and is more particularly concerned with improvements in apparatus for salvaging the remnant liquid which tends to cling to the inner surface of the egg shell.

After an egg has been broken and the major portion of its contents poured into a suitable receptacle it has been the practice in large processing plants to place the shell halves over a suitable suction nozzle or mandrel for the purpose of drawing the remnant liquid clinging to the shell into a salvage receptacle. This procedure is very effective and in a large scale operation the liquid egg material thus salvaged reaches astonishing proportions. However, it imposes additional duties on the individual workers and this naturally reduces the number of eggs which can be handled by each person in the course of a working day; the loss of time occurs mainly in connection with the removal of the shell halves from the suction mandrels after the salvage operation, a step which in the past has required the suction to be cut off manually in order to release the shell halves from the mandrels.

It is an important object of the present invention, therefore, to provide a method and apparatus by which the handling of eggs may be speeded up. More specifically, it is an object of the invention to provide an arrangement which facilitates the removal of shell halves from the suction mandrel after the remnant liquid material clinging to the inside thereof has been salvaged.

With a view to achieving these objects apparatus has been provided which automatically ejects the shell of one egg from the suction mandrel responsive to the worker breaking the next egg.

According to a feature of the invention the shell halves are blown off the mandrels by compressed air. Another feature resides in the provision of apparatus for altering the position of the mandrel during the ejection of the shell halves therefrom whereby such ejection does not interfere with the operator's preparations to place other shell halves on the mandrels.

It is essential in an egg processing plant that all parts coming into contact with the liquid egg material be kept very clean and another object of the invention is to provide salvage apparatus of the kind indicated above which is adapted to be disassembled quickly and easily for cleaning.

A further object is to provide an improved coupling between the salvage receiving receptacle and the balance of the apparatus whereby the receptacle may be quickly and easily removed and replaced when full.

Other objects and features will appear in the course of the following description of the invention.

Figure 4:
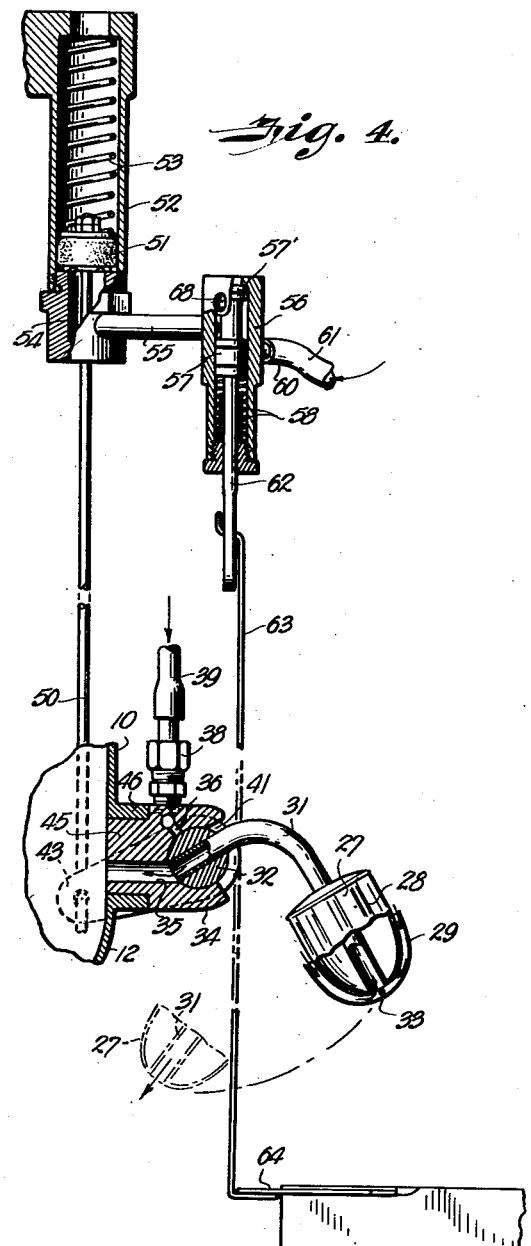

In the accompanying drawings which form a part of the specification and are to be read in conjunction therewith, and in which like reference numerals refer to like parts of the various views, Fig. 1 is a front elevation of the apparatus which I employ for breaking eggs and salvaging the liquid material from the shells, Fig. 2 is a side elevation of the apparatus, Fig. 3 is a view of the apparatus taken along the line 3—3 of Fig. 2 in the direction of the arrows, Fig. 4 is an enlarged sectional view taken along the line 4—4 of Fig. 1 in the direction of the arrows, and Figs. 5 and 6 are perspective views of cooperating parts of the valve and suction nozzle or mandrel.

Referring more particularly to the drawings, my salvaging apparatus has a suction chamber comprising a cylindrical barrel 10, a cap 11 secured to the upper end of the barrel and a generally funnel-shaped bottom piece 12 secured to its lower end. The weight of the suction chamber is carried by a bracket 13 and this in turn is suspended by the fittings 14, 15 and 16 from a T 17 which is attached to the lower end of a vertical supporting pipe 18.

The upper end of pipe 18 is connected to a suction line (not shown) which has associated therewith a suitable vacuum pump; thus through pipe 18, T 17, extension pipe 20 and a flexible hose 21, the suction line communicates with the suction chamber of my apparatus. In order to control the suction imposed on the chamber, a butterfly valve 22 having an operating handle 23 is provided in cap 11. The valve may be completely opened by turning the handle to an upright position and it is substantially closed when the handle is horizontal, the butterfly being notched as shown in Fig. 3, however, to prevent it from completely blocking the throat of the valve when the handle is horizontal.

At the lower extremity of the suction chamber the bottom piece 12 is provided with a flanged screw collar 25 having a segment of its rim cut away to permit the bead 24 on the upper end of a receptacle 26 to be inserted readily into the collar from the side. After such insertion the collar may be rotated a fraction of a turn to draw the mouth of the receptacle up into engagement with an annular gasket at the bottom of the funnel-like member 12 and thereby seal the receptacle to the suction chamber. This arrangement makes it possible to attach and detach the receptacle very quickly and permits a glass milk bottle of conventional shape to be used as the receptacle, if desired.

The bottom piece 12 also supports two oppositely disposed identical units each having a pair of shell-receiving mandrels 27. Ovoid in shape, these mandrels are smaller in diameter than the smallest egg which is expected to be placed over the end thereof, and they have outwardly raised ribs 28 designed to maintain a space between superposed egg shell (29) and the exterior of the mandrel. Each mandrel is brazed or otherwise affixed to a rigid supporting tube 31, the upper end of which is firmly positioned in a transverse hole in the cylindrical valve shaft or plug 32. The opposite end of the supporting tube extends downwardly through the center of the mandrel and communicates with the lower end thereof to form an intake nozzle for the remnant liquid egg material in the egg shell. A curved bar 33 bridges the nozzle diagonally to maintain the lower end of the shell spaced from the inlet and also to prevent shell fragments from entering the tube.

The aforementioned cylindrical valve plug 32 is rotatably supported in the valve housing 34 which has a pair of ducts 35 adapted to register with respective ones of the tubes 31 when the valve shaft is positioned as shown in Fig. 4. A second pair of smaller ducts 36 are arranged to register with the tubes when the valve shaft is turned clockwise through an angle of approximately 85°, as will be described presently. The latter ducts communicate with a nipple 38 which is connected by a hose 39 to an air line 40, a conventional pump or other source of air pressure (not shown) being associated with the air line to build up the pressure therein.

Although the valve plug 32 is adapted to turn about its own axis it normally is restrained against axial movement by means of a shoulder 41 which bears against one end of the valve housing and a pin 42 which bears against the other end. The valve may easily be disassembled, however, by turning the operating arm or lever 43 up until pin 42 is positioned opposite the transverse forward opening in the valve housing, and then moving the shaft laterally to the right to draw it out of the housing. This arrangement makes it very convenient and easy to clean the valve and associated parts.

In order to mount the valve on the suction chamber the valve housing is provided with a rearwardly extending shank 45 which slides into a supporting ferrule 46 on the bottom piece of the chamber. The suction acting on the shank draws the valve assembly home, while a spline 47 cooperating with a keyway 48 in the shank prevents the assembly from turning in the ferrule. Simply by closing the butterfly valve 22 the suction may be reduced sufficiently to permit the valve housing to be withdrawn from its support and this further facilitates cleaning of the valve.

Referring now to the valve operating arm lever 43, it will be seen that this is linked to the lower extremity of a vertical rod 50, the upper end of the rod being secured to a piston 51 which is adapted to move in the cylinder 52. A coiled compression spring 53 acting on the top of the piston normally maintains it and the associated rod 50 depressed, whereby the valve shaft and suction mandrels 27 supported thereon normally occupy the position shown.

Communicating with the chamber 54 beneath the piston is a tube 55 which supports an air valve, the construction of which is best seen in Fig. 4; it comprises a cylinder 56 having axially slidable therein a valve member 57 urged upwardly by a coiled compression spring 58. The valve thus normally blocks the air inlet 60 which is connected by a suitable hose 61 to the air line 40. Depending from the valve stem 62 is a rod 63 having at its lower extremity a horizontal platform or table 64. This table contains a narrow slot through which a stationary knife 65 extends, the sharpened edge of the knife being positioned slightly above the level of the table. The knife is supported by means not shown so that its height is adjustable over a limited range to suit the convenience of the worker; a corresponding adjustment in the level of the table 64 may be made by inserting the stirrup at the upper end of rod 63 in different ones of a series of holes 66 in the flattened portion of the valve stem.

Although only one piston and air-control valve therefor have been described, it will be understood that there are two identical ones of such units. These are supported by member 15 on opposite sides of the suction chamber, and each cooperates with one pair of shell-receiving suction mandrels 27.

Having described the construction of my apparatus I now will explain the manner in which it is used. Two operators sit facing one another with the unit between them so that one pair of suction mandrels is before each operator. Within convenient reach of each operator is a carton or basket of eggs, and from this the operator takes the eggs one at a time, breaking each egg in half over the stationary knife 65 and pouring its contents into receptacles (not shown) which are situated below the knife. This removes all of the fluid egg material except that which clings to the interior of the shell and it is an operation which may be performed and repeated with great rapidity by a practiced operator.

In order to salvage the liquid egg material clinging to the interior of each shell, the operator, after dumping the major part of the contents as described, quickly places the two halves of the shell over the mandrels 27 and leaves them there while she reaches for another egg. The suction maintains the shell halves in place and also creates a strong current of air moving along the inner surface of the shell in the direction of the arrows in Fig. 4 to carry the remnant egg material downwardly within the shell and up tube 31 into the suction chamber, from which it drains into the receptacle 26.

After the shell halves have been cleaned it is necessary to remove them from the mandrels to make way for another egg. Unfortunately the suction makes such removal virtually impossible, and accordingly in the past it has been the practice to provide a manually operable valve by means of which the operator could cut off the suction briefly while she brushed or knocked the shells from the mandrel with the side of her hand. This awkward and time-consuming step interferes with the handling of the next egg and it is obviated by my arrangement.

With my apparatus, the shell halves remain on the mandrels while the operator reaches for another egg but they are ejected automatically when the latter egg is broken, and accordingly the mandrels are ready to receive the shell of the latter egg when the contents thereof have been dumped. More specifically, when an egg is moved sharply down on the knife 65 to break it, the two halves strike the table 64 and depress same momentarily. This, through rod 63, draws valve 57 down against the force of spring 58 whereby the upper portion (57') of the valve covers the exhaust port 68 while the lower portion thereof simultaneously uncovers the inlet 60, permitting air under pressure to escape into chamber 54 through pipe 55. The pressure below piston 51 forces it upwardly against spring 53 and by means of rod 50 and lever 43 this turns the rotary valve plug 32 clockwise (Fig. 4). As the plug turns, the suction orifices first are disconnected from pipes 31 and then, as the mandrels 27 reach the position shown dotted, the air pressure orifices 36 are connected to the same pipes so that the shell halves are forceably blown therefrom in the direction of the arrow, whereupon they fall into a suitable waste receptacle (not shown).

It will be understood that the downward movement of the platform 64 occasioned by the breaking of an egg over knife 65 is very brief and that spring 58 restores the valve 57 to normal when the pressure is removed from the platform. Upon returning to normal, the valve blocks the air inlet 60 and at the same time uncovers apertures 68, whereby spring 53 can force piston 51 downwardly (causing the air beneath same to exhaust into the open atmosphere through pipe 55 and orifice 68) and thus the rotary plug 32 and the associated suction mandrels 27 are restored to the position shown in solid lines.

Accordingly, the mandrels are ready to receive another pair of shell halves for the purpose of salvaging the liquid egg material therefrom. The time required for the apparatus to automatically eject one pair of shell halves and return to a state of readiness to receive another pair is about the same as the operator needs for dumping the contents of the egg after breaking same and therefore it will be seen that there is neither any lost time nor any lost motion on the part of the operator.

Whenever receptacle 26 becomes full of the liquid egg material salvaged from the shells, the handle 22 of the butterfly valve is turned to a horizontal position to reduce the suction imposed upon the suction chamber and cap 25 then is turned a fraction of a revolution, releasing receptacle 26 so that it may be removed laterally through the side opening of the cap. The receptacle is emptied and replaced (or a new one substituted for it) whereupon cap 25 again may be quickly tightened and butterfly valve 22 reopened to restore the apparatus to service. The manner in which the rotary valve and shell-receiving mandrel unit may be quickly disassembled for cleaning has already been described.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and subcombinations. This is contemplated by and is within the scope of the claims.

Inasmuch as many possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. Salvaging apparatus for extracting the remnant liquid egg material from egg shell halves, comprising a rotary valve supported in a stationary housing, a shell-receiving mandrel mounted on the valve and fixedly secured thereto to turn therewith relative to said housing, a duct in the valve communicating with the interior of a shell half when same is positioned on the mandrel, a conduit in the housing adapted to register with the duct only when the valve occupies a predetermined angular position with respect to the housing, and suction means connected to the conduit for producing a subatmospheric pressure in the duct when the valve occupies said predetermined position.

2. Salvaging apparatus as claimed in claim 1, wherein said valve has a pin normally preventing axial movement of the valve in the housing, and a passage in the housing through which the pin is adapted to move parallel to the axis of the valve when the valve occupies a predetermined rotary position with respect to the housing.

3. Salvaging apparatus for extracting the remnant liquid egg material from egg shell halves, comprising a rotary valve supported in a stationary housing, a shell-receiving mandrel mounted on the valve and fixedly secured thereto to turn therewith relative to said housing, a duct in the valve communicating with the interior of a shell half when same is positioned on the mandrel, a conduit in the housing adapted to register with the duct only when the valve occupies a predetermined angular position with respect to the housing, suction means connected to the conduit for producing a subatmospheric pressure in the duct when the valve occupies said predetermined position, a second conduit in the housing adapted to register with the duct only when the valve occupies a different angular position with respect to the housing, and a source of fluid pressure connected to said second conduit to produce a superatmospheric pressure in the duct when the valve occupies said different position.

4. In salvaging apparatus wherein shell halves are placed on a suction mandrel to remove remnant liquid egg material therefrom, the improvement which comprises a stationary knife blade on which eggs are adapted to be broken, a movable member adjacent the blade so it is engaged and moved by an egg when same is broken upon the blade, and apparatus operated responsive to said movement of the member to forceably eject from the mandrel a shell half previously placed thereon.

5. Apparatus as claimed in claim 4 wherein said member comprises a platform having therein a slot through which the edge of said knife protrudes.

6. In salvaging apparatus wherein shell halves are placed on a suction mandrel to remove remnant liquid egg material therefrom, the improvement which comprises a stationary knife blade on which eggs are adapted to be broken, a source of fluid pressure, a movable member adjacent the blade so it is engaged and moved by an egg when same is broken upon the blade, and means operated responsive to the movement of said member for directing fluid from said source against the interior of a shell half previously placed on the mandrel to eject same from the mandrel.

7. A salvaging apparatus comprising a suction mandrel for removing liquid egg material from shell halves, in combination with means for forcibly ejecting a shell half from said mandrel, an anvil upon which eggs are adapted to be broken manually at any desired intervals, means actuated by the breaking of an egg on said anvil, and apparatus controlled by said last means for actuating said ejecting means when an egg is broken on said anvil.

8. In salvaging apparatus for extracting liquid egg material from shell halves, an anvil on which eggs are adapted to be broken manually at any desired intervals, a device actuated by the breaking of an egg on said anvil, a valve comprising a stationary housing having a circular plug journaled therein for limited rotation in either direction, said plug having a predetermined normal position, trip mechanism having operative connection to said device and also to said plug, said mechanism actuated under control of said device responsive to the breaking of an egg on said anvil to momentarily rotate said plug off normal and then automatically return it to said normal position, said valve housing containing a duct whose end confronts said plug and is covered and closed by the plug when same is off normal, suction means connected to said duct for maintaining subatmospheric pressure in the duct, said plug containing a substantially radial bore positioned to register with said duct when the plug is in said normal position, a shell receiving mandrel carried by said plug and fixedly secured thereto to turn with the plug, and an enclosed passageway extending from said bore through said mandrel and communicating at its other end with the interior of a shell half when same is positioned on the mandrel.

9. Salvaging apparatus as in claim 8 wherein said housing contains a second duct whose end is positioned to register with said bore when said plug is in its off normal position, said last duct being covered and closed by said plug when same is in its normal position, and a source of air pressure connected to said last duct.

10. In salvaging apparatus for extracting liquid egg material from egg shell halves, a valve comprising a stationary housing having a circular plug journaled therein for rotation in either direction, lever means for turning said plug alternately in opposite directions between two predetermined end positions, a shell receiving mandrel fixedly secured to said plug to turn therewith, an air duct communicating at one end with the interior of a shell half when same is positioned on the mandrel, said duct extending from said one end through said mandrel into said plug and having its opposite end opening substantially radially outward through the peripheral side wall of the plug, said valve housing containing a pair of ports positioned so the respective ones thereof register with said duct in the opposite end positions of said plug, each of the ports being covered and closed by the side wall of the plug when said duct is out of register with that port, a source of air pressure connected to one of the ports, and suction means connected to the other port.

11. In salvaging apparatus for extracting liquid egg material from egg shell halves, a valve comprising a stationary housing having a circular plug journaled therein for rotation about a horizontal axis, lever means for turning said plug alternately in opposite directions between two end positions, said plug having a cross bore with a rigid tube secured therein and projecting radially from one side of the plug through an opening in the housing, said housing having a pair of ports so positioned that the respective ones thereof register with said cross bore in the opposite end positions of the plug, each of said ports being covered and closed by the side wall of a plug when said cross bore is out of register with that port, a source of air pressure connected to one of said ports, suction means connected to the other port, and a shell receiving mandrel carried on the free end of the tube, said mandrel constructed and arranged so the bore of the tube communicates with the interior of a shell half when same is positioned on the mandrel.

12. Apparatus as in claim 11 wherein the axis of said tube at its free end is transverse to the axis of said cross bore.

13. Salvaging apparatus for extracting the remnant liquid egg material from egg shell halves, comprising a mandrel conforming in shape with the interior of a shell half, spacers on the mandrel for maintaining a space between the same and a shell half superposed over the mandrel, a duct extending through the mandrel and communicating at one end with the space between the mandrel and the shell half, suction means associated with the other end of the duct for drawing air through said space and into the duct, a source of air pressure, valve means operable to shut off said suction means and substantially simultaneously connect said source to said other end of the duct to eject the shell half from the mandrel, an anvil on which eggs are adapted to be broken manually at any desired intervals, means actuated by the breaking of an egg on said anvil, and apparatus controlled by said last means for actuating said valve means whenever an egg is broken on said anvil.

14. Salvaging apparatus as claimed in claim 3, having mechanism for rotating said valve from said predetermined position to said different position, an anvil upon which eggs are adapted to be broken manually at any desired intervals, and means actuated by the breaking of an egg on said anvil for actuating said mechanism responsive thereto.

15. Salvaging apparatus for extracting the remnant liquid egg material from egg shell halves, comprising a mandrel conforming in shape with the interior of a shell half, spacers on the mandrel for maintaining a space between same and a shell half superposed over the mandrel, a duct extending through the mandrel and communicating at one end with the space between the mandrel and the shell half, suction means associated with the other end of the duct for drawing air through said space and into the duct, an anvil upon which eggs are adapted to be broken manually at any desired intervals, apparatus actuated by the breaking of an egg on said mandrel, and mechanism controlled by said apparatus for disconnecting said suction means from the duct when an egg is broken on said anvil.

16. Salvaging apparatus for extracting a remnant liquid egg material from egg shell halves, comprising an anvil upon which eggs are adapted to be broken manually at any desired intervals, means actuated by the breaking of an egg on said anvil, a mandrel conforming in shape with the interior of a shell half and adapted to be positioned therein, suction means creating a subatmospheric presure between the mandrel and the interior of the shell half, and apparatus controlled by said first means upon the breaking of another egg on said mandrel for automatically disabling said suction means thereby to release the shell half from the mandrel.

17. In salvaging apparatus wherein shell halves are placed on a suction mandrel to remove remnant liquid egg material therefrom, and wherein the mandrel occupies a predetermined position when the shell halves are placed thereon, the improvement which comprises an anvil upon which eggs are adapted to be broken manually at any desired intervals, apparatus actuated by the breaking of an egg on said anvil, mechanism controlled by said apparatus for temporarily shifting the mandrel to a discharge position responsive to the breaking of an egg on said anvil and then restoring it to said predetermined position, and means automatically controlled in accordance with the position of said mandrel for forcibly ejecting a shell half from the mandrel during the time it is in said discharge position.

18. Salvaging apparatus for extracting remnant liquid egg material from shell halves, comprising a stationary support, a mandrel movably mounted on said support, means normally maintaining said mandrel in a predetermined position on the support, said mandrel conforming in shape with the interior of a shell half, spacers on the mandrel for maintaining a space between the same and a shell half superposed over the mandrel, a duct extending through the mandrel and communicating at one end with the space between the mandrel and the shell half, suction means associated with the other end of the duct when said mandrel is in said predetermined position for drawing air through said space and into said duct, an anvil on which eggs are adapted to be broken manually at any desired intervals, apparatus actuated by the breaking of an egg on said mandrel, means controlled by said apparatus for moving said mandrel away from said predetermined position when an egg is broken on said anvil, and valve means automatically controlled in accordance with the position of said mandrel for shutting off said suction means responsive to said movement of the mandrel thereby to release from the mandrel the shell half superposed thereon.

JOHN M. VANSANT.

REFERENCES CITED

The following references are of record in the file of this patent:

UNITED STATES PATENTS

| Number | Name | Date |
| --- | --- | --- |
| 652,376 | Snell | June 26, 1900 |
| 675,112 | Rutherford | May 29, 1901 |
| 1,290,262 | Lyttle | Jan. 7, 1919 |
| 1,538,609 | Barnett | May 29, 1925 |
| 1,697,691 | Peters | Jan. 1, 1929 |
| 1,764,158 | Edwards | June 17, 1930 |
| 1,941,088 | Heller | Dec. 26, 1933 |
| 2,016,577 | Pearson | Oct. 8, 1935 |
| 2,075,341 | Goodman | Mar. 30, 1937 |
| 2,206,959 | Irish | July 9, 1940 |
| 2,206,960 | Irish | July 9, 1940 |
| 2,260,836 | Haegele | Oct. 28, 1941 |
| 2,269,254 | Cribb | Jan. 6, 1942 |
| 2,423,482 | Chochol | July 8, 1947 |